UNITED STATES PATENT OFFICE.

JOHANN JAKOB BRACK, OF BASLE, SWITZERLAND, ASSIGNOR TO L. DURAND, HUGUENIN & CO., OF ST. FONS, FRANCE, BASLE, SWITZERLAND, AND HÜNINGEN, GERMANY.

BLUE TETRAZO DYE.

SPECIFICATION forming part of Letters Patent No. 516,760, dated March 20, 1894.

Application filed December 21, 1893. Serial No. 494,283. (Specimens.) Patented in France January 27, 1893, No. 227,474, and in England January 27, 1893, No. 9,183.

*To all whom it may concern:*

Be it known that I, JOHANN JAKOB BRACK, a citizen of the Swiss Republic, residing at Basle, Switzerland, have invented new and useful Improvements in the Production of Tetrazo Coloring Matters, (partly patented in France by Letters Patent No. 227,474, dated January 27, 1893, and in England by Letters Patent No. 9,183, dated, under International Convention, January 27, 1893, date of application May 8, 1893,) of which the following is a specification.

This invention relates to the manufacture of new tetrazo-coloring matters which dye unmordanted cotton in an alkaline bath and are obtained by combining a naphtol sulfonic acid with the tetrazo-derivative of a diamido-base obtained by the condensation of formaldehyde with dianisidin and the hydrochlorate of an aromatic diamin.

By way of example, I will now describe the production of the blue coloring matters obtained with alpha-naphtol alpha-mono sulfonic acid and the diamido-bases derived from formaldehyde, dianisidin and the hydrochlorate of dianisidin or phenylendiamins.

I. *Production of the dye by combining alpha-naphtol alpha-mono-sulfo-acid with the tetrazo-compound of the diamido-base derived from formaldehyde, dianisidin and the hydrochlorate of dianisidin.*—Five kilos of the diamido-base obtained by the condensation of one molecule of formaldehyde with one molecule of dianisidin and one molecule of the hydrochlorate of dianisidin, are diazotized by means of eight kilos of hydrochloric acid at 21° Baumé and 1.4 kilos of sodium nitrite and the tetrazo-product obtained is poured into a solution containing 4.5 kilos of alpha-naphto alpha-mono-sulfonic acid and six kilos of carbonate of soda. After leaving the mass to itself for several hours, it is heated to ebullition and the coloring matter is precipitated by the addition of sea salt. This coloring matter, when dried, appears as a deep brown powder with a metallic luster, and dyes unmordanted cotton in an alkaline bath a blue tint. Its solution in concentrated sulfuric acid is gray blue. It is readily soluble in water but only slightly soluble in alcohol.

II. *Production of the dye by combining alpha-naphtol-alpha-mono-sulfonic-acid with the tetrazo-compound of the diamido-base derived from formaldehyde, dianisidin and the hydrochlorate of meta-phenylendiamin.*—If in the preceding example the five kilos of the diamido-base, derived from formaldehyde, dianisidin and the hydrochlorate of dianisidin, be replaced by 3.6 kilos of the diamido-base obtained by the condensation of one molecule of formaldehyde with one molecule of dianisidin and one molecule of metaphenylendiamin, there is obtained a new blue coloring matter which when applied to unmordanted cotton is distinguished by a vivid greenish blue tint. It forms a brown powder with a metallic luster which dissolves with a greenish blue color in concentrated sulfuric acid, is readily soluble in water, and is sparingly soluble in alcohol.

III. *Production of the dye by combining alpha-naphtol-alpha-mono-sulfonic acid with the tetrazo-compound of the diamido-base derived from formaldehyde, dianisidin and the hydrochlorate of paraphenylendiamin.*—By using the diamido-base derived from formaldehyde, dianisidin and the hydrochlorate of paraphenylendiamin in place of the corresponding meta-phenylendiamin-compound, there is obtained a coloring matter which dyes unmordanted cotton a blue violet tint. The solution of the dark brown powder in concentrated sulfuric acid is of a grayish blue color. This powder is readily soluble in water and but slightly soluble in alcohol.

What I claim as my invention, and wish to secure by Letters Patent, is—

1. The herein described process for the manufacture of tetrazo-coloring matters which consists in combining two molecules of alpha-naphtol-sulfonic acid with one molecule of the tetrazo-derivative of the diamido-base resulting from the condensation of equivalent quantities of formaldehyde, dianisidin and the hydrochlorate of an aromatic diamin, as set forth.

2. The herein described process for the manufacture of tetrazo-coloring matters which consists in combining two molecules of alpha-naphtol-alpha-mono-sulfonic acid with one molecule of the tetrazo-derivative of the diamido-base resulting from the condensation of equivalent quantities of formaldehyde, dianisidin and the hydrochlorate of an aromatic diamin, as set forth.

3. The herein described coloring matter derived from alpha-naphtol-alpha-mono-sulfoacid and the diamido-base resulting from the condensation of formaldehyde with dianisidin and the hydrochlorate of an aromatic diamin, which in its dry state is a brown powder, dyes unmordanted cotton a blue tint, dissolves in concentrated sulfuric acid with a blue color, dissolves readily in water and sparingly in alcohol as set forth.

In witness whereof I have hereunto signed my name in the presence of two subscribing witnesses.

JOHANN JAKOB BRACK.

Witnesses:
 THEODORE STACHELIN,
 GEORGE GIFFORD.